Figure 1:
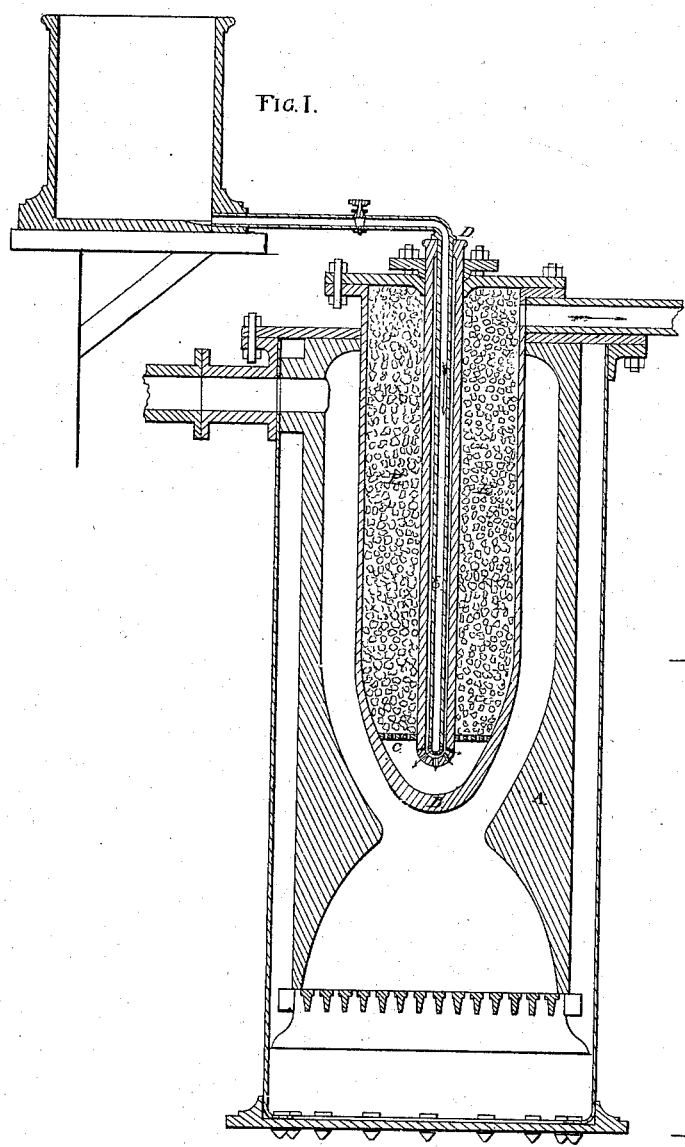
Figure 2:
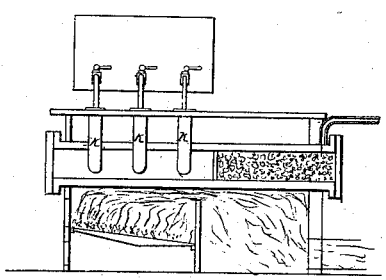
Figure 3:
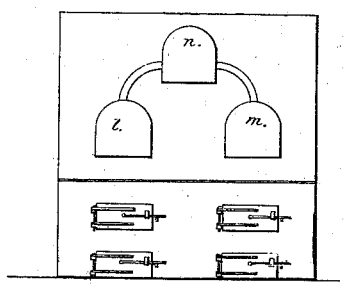

A. LONGBOTTOM.
GAS PURIFYING APPARATUS.

No. 8,705.  Patented Feb. 3, 1852.

UNITED STATES PATENT OFFICE.

ABRAM LONGBOTTOM, OF NEW YORK, N. Y.

GAS-PURIFYING APPARATUS.

Specification of Letters Patent No. 8,705, dated February 3, 1852.

*To all whom it may concern:*

Be it known that I, ABRAM LONGBOTTOM, of the city, county, and State of New York, have invented a new and useful Improvement in Apparatus for Generating and Purifying Illuminating-Gas; and I do hereby declare that the following is a full, clear, and exact description of the same, reference being made to the annexed drawing, making a part of this specification, in which—

Figure I is a vertical transverse section. Figs. II and III exhibit modifications of my invention, and similar letters refer to similar parts throughout.

My invention relates to certain improvements in the method of purifying illuminating gas, whereby the washing apparatus is wholly done away with, so that the gas comes from the retorts or furnaces completely purified and ready for consumption. This result I effect by introducing the purifying materials within a part of the same retort in which the gas is generated and thus effect the purification under heat.

At A is represented a furnace built of some proper substance for resisting the action of heat, and formed of a vertical shape to receive a vertical retort. The furnace is provided with proper grates, ash pit, flue, &c. Within this furnace a vertical retort B is set, the lower end or point of which I prefer to make in the shape of a prolate spheroid, and thickened up in the casting, as shown, to withstand the heat. The furnace over the grate is contracted so as to cause the current of escaping gases to impinge first upon the point of the retort and afterward to pass up around the sides of the escape pipe. The retort is divided near the bottom by a perforated plate or grating, seen at C, and through the center a distributer D is introduced consisting of a large pipe (the lower end being perforated with holes) extending from the top down to a point near the bottom below the perforated plate and forming a protecting conductor and cooler for the small feed pipe (E).

The material from which the gas is to be made is led in a fluid state from a reservoir through the small pipe (E) to the bottom of the distributer D, which delivers it to the heated bottom of the retort, thus obviating any trickling and preventing the pipes from getting fouled or furred from the lodgment of particles partially resolved into gas.

The space remaining above the perforated plate C is to be occupied by the purifying materials as seen at E. These consist of one half quick-lime and one half animal charcoal reduced to lumps of suitable size that when put in they will not pack but leave spaces through which the gases evolved in the space below the plate C may pass. The feed is to be drop by drop of the oil or other material, the design being to prevent any accumulation from ever taking place in the bottom of the retort. The surface exposed therefore is to be sufficient to decompose the whole of one before the next deposit, and this can only be perfectly insured by a drop by drop feed. As fast as the gas is generated it ascends through the mass of purifying materials which have acquired a graduated degree of temperature; that part nearest the bottom of the retort being of a dark red heat which heat gradually decreasing as it approaches the top of retort can more readily act chemically upon such portions of the composition forming the crude gas as are to be separated and purified out of it, as the ammonia, carbonic acid, tar, &c. These are all acted on by the lime and animal charcoal in a manner well known and are either neutralized or arrested as is the case with the tar, leaving the carbureted hydrogen to flow pure for combustion at the burners. I prefer animal to vegetable charcoal for the reason that animal charcoal has at a low temperature the same chemical effect upon the gas as vegetable charcoal will have at a high temperature, and thus by employing animal charcoal at low temperatures I preserve more effectually the purifying qualities of the lime, for if that were heated to the temperature required to render vegetable charcoal most efficient, its qualities as a purifier would be greatly impaired.

By this method of purification the gas can be burned directly from the retort if necessary as it does not require to be washed by passing through water. It may however be stored for use, in the gas holder of common construction.

Fig. II represents a modification in which the retort is horizontally placed instead of being vertical. A division is introduced about midway, consisting of a perforated plate, as seen at (*i*). The part back of this division is to contain purifying materials. The front part has a series of openings by which the feed is to be effected and in these the feed tubes are to be inserted on the same principle as before described for the vertical retort. The number of distributers therefore is such that they are spaced so far apart as will effect the feed upon such an extent of surface along the retort as shall be capable of decomposing the feed, as seen at the letter (k).

Fig. III shows a plan for purifying coal gas (l, m, n,) being D retorts or others of common construction arranged triangularly in the furnace; (l) and (m) are the retorts for holding the coal; and (n) is the purifying retort containing the lime and charcoal. Connections are formed at one end, and discharge pipes at the other leading to the burners or to a gas holder as before described.

To clean the purifiers nothing more is necessary than to allow the heat to act upon them at each firing for a short time before the feeding is commenced and by opening a discharge pipe, (the tar being burned off), the whole of the foreign substances will be expelled. The purifying quality of the lime, &c., will however become exhausted, and those must then be replaced by fresh material. The proper time for this is ascertained by the usual test applied to a current of the gas.

What I claim as my invention and desire to secure by Letters Patent is:

Purifying the gas by passing it through a mixture of equal measures of quick lime and of animal charcoal in the same retort in which the gas is generated but at a temperature so regulated that at the lowest, or where the gas enters the composition, the mass is at a low red heat; and at the top, or where it leaves the composition the heat is below redness, substantially in the manner herein set forth.

ABRAM LONGBOTTOM.

Witnesses:
S. H. MAYNARD,
JOHN W. KILSBY, Jr.